United States Patent
Liu et al.

(10) Patent No.: US 9,474,418 B1
(45) Date of Patent: Oct. 25, 2016

(54) BARBECUE TONGS

(71) Applicant: NEXTORCH INDUSTRIES CO., LTD., Guangdong (CN)

(72) Inventors: Guanpeng Liu, Guangdong (CN); Bing Liang, Guangdong (CN); Andrew Mark Ager, Guangdong (CN)

(73) Assignee: NEXTORCH INDUSTRIES CO., LTD., Guangdong (CN)

( * ) Notice: Subject to any disclaimer, the term of this patent is extended or adjusted under 35 U.S.C. 154(b) by 0 days.

(21) Appl. No.: 14/790,983

(22) Filed: Jul. 2, 2015

(51) Int. Cl.
*C03B 35/20* (2006.01)
*A47J 43/28* (2006.01)

(52) U.S. Cl.
CPC .................................. *A47J 43/283* (2013.01)

(58) Field of Classification Search
CPC ...... A47J 43/283; A47J 45/11; A47G 21/10; B25B 7/00; B25B 7/06
USPC .................. 294/118, 16, 99.2, 3, 8.5, 11, 13
See application file for complete search history.

(56) References Cited

U.S. PATENT DOCUMENTS

| | | | | |
|---|---|---|---|---|
| 64,904 A * | 5/1867 | Perry | ................. | B25B 23/0085 294/3 |
| 486,963 A * | 11/1892 | Bartholomew | ......... | F24B 15/10 294/11 |
| 1,496,523 A * | 6/1924 | Clary | .................... | A47G 21/10 294/104 |
| 1,538,536 A * | 5/1925 | Wisoff | .................. | A47J 43/283 294/177 |
| 2,531,987 A * | 11/1950 | Pilliod | ................... | A22C 25/06 294/118 |
| 3,358,586 A * | 12/1967 | Thorngren, Sr. | .... | A47J 37/0611 294/16 |
| 4,727,876 A * | 3/1988 | Porat | ..................... | A61B 17/30 294/99.2 |
| 4,964,663 A * | 10/1990 | Jermyn | ................. | A61F 9/0061 294/1.2 |
| 8,348,317 B1 * | 1/2013 | Bird | ......................... | A45F 5/00 248/75 |
| 8,376,429 B2 * | 2/2013 | Hager | ..................... | A47J 45/10 294/118 |
| 2005/0168972 A1 * | 8/2005 | Raichlen | ............. | A47J 37/0786 362/120 |
| 2009/0267372 A1 * | 10/2009 | Chen | ........................ | B25B 9/02 294/99.2 |
| 2010/0295326 A1 * | 11/2010 | Chen | ........................ | B25B 9/02 294/99.2 |
| 2011/0140639 A1 * | 6/2011 | Shih | ......................... | B25B 9/02 315/362 |
| 2012/0139276 A1 * | 6/2012 | Green | .................... | A47J 43/283 294/86.4 |
| 2015/0062876 A1 * | 3/2015 | Brauner | .................... | B25B 7/06 362/119 |

FOREIGN PATENT DOCUMENTS

GB        2274082 A  *  7/1994  .............. B25B 7/00

* cited by examiner

*Primary Examiner* — Gabriela Puig
(74) *Attorney, Agent, or Firm* — Moore & Van Allen PLLC; Henry B. Ward, III

(57) ABSTRACT

A disclosure discloses a barbecue clamp. The barbecue clamp includes two connected clamping handles, each of the two clamping handles being provided with a clamping portion and a handle portion, wherein the two clamping handles are intersected; an accommodation space is formed at the intersection of the two clamping handles, a pivoting shaft is arranged on each of two opposite sides of the accommodation space, and the two clamping handles are arranged in a manner of rotating around the pivoting shafts; an illumination portion is arranged in the accommodation space, and an illuminating direction of the illumination portion faces a clamping area between the clamping portions of the two clamping handles. According to the technical solution of the invention, force can be conveniently applied to clamp an object, the handles are farer away from a fire source, and meanwhile, the barbecue clamp is convenient to operate with one hand.

10 Claims, 3 Drawing Sheets

BARBECUE TONGS

TECHNICAL FIELD OF THE INVENTION

The disclosure relates to the technical field of barbecue tools, and in particular to a barbecue clamp.

BACKGROUND OF THE INVENTION

An existing barbecue clamp is usually of a U-shaped structure, and when the barbecue clamp is used, a user handholds a cambered section of the U-shaped structure to apply force to clamp an object with a clamping end of the barbecue clamp. Such a barbecue clamp of the U-shaped structure is inconvenient for force application, and during use, the hand of the user may get closer to a fire source to be easily scalded. In addition, the barbecue clamp is not provided with an illumination device, and the user is required to handhold the barbecue clamp with one hand and handhold a lamp for illuminating to observe a barbecue condition with the other hand, so that the barbecue clamp is very inconvenient.

SUMMARY OF THE INVENTION

The disclosure is intended to provide a barbecue clamp, which can conveniently apply force to clamp an object, has handles farer away from a fire source and simultaneously is convenient to operate with one hand.

In order to achieve the purpose, according to an aspect of the disclosure, a barbecue clamp is provided, which comprises two connected clamping handles, each of the two clamping handles being provided with a clamping portion and a handle portion, wherein the two clamping handles are intersected, and the clamping portion and handle portion of each clamping handle are positioned on two opposite sides of an intersection of the two clamping handles; an accommodation space is formed at the intersection of the two clamping handles, a pivoting shaft is arranged on each of two opposite sides of the accommodation space, the pivoting shafts are arranged at an interval along the same pivoting axis, and the two clamping handles are arranged in a manner of rotating around the pivoting shafts; and the barbecue clamp further comprises an illumination portion, the illumination portion is arranged in the accommodation space, and an illuminating direction of the illumination portion faces a clamping area between the clamping portions of the two clamping handles.

Furthermore, each of the two clamping handles comprises a connecting portion, the connecting portion is connected between the clamping portion and the handle portions, the connecting portion of the two clamping handles are intersected, the accommodation space is formed at the intersection, and the pivoting shafts are arranged at the intersection in a penetration manner.

Furthermore, the connecting portion of each clamping handle is inclined relative to the corresponding clamping portion and handle portion.

Furthermore, the connecting portion of each clamping handle is of a ring structure, an inner ring of the connecting portion of the first clamping handle in the two clamping handles is detachably inserted in an inner ring of the connecting portion of the second clamping handle, and the accommodation space is formed between the inner rings of the connecting portions of the two clamping handles.

Furthermore, the illumination portion comprises: a sleeve, inserted in the accommodation space; and a light source, detachably connected to the interior of the sleeve in a pressing manner.

Furthermore, the sleeve is provided with a plurality of lug bosses extending along a radial direction of the sleeve, the lug bosses are provided with first shaft holes, the connecting portion of the first clamping handle is provided with mounting holes, the connecting portion of the second clamping handle is provided with second shaft holes, the lug bosses are detachably inserted in the mounting holes, and the pivoting shafts are detachably arranged in the first shaft holes and the second shaft holes in a penetration manner.

Furthermore, a plurality of first limiting blocks are arranged on an outer wall surface of the connecting portion of the first clamping handle, a plurality of second limiting blocks are arranged on an inner wall surface of the connecting portion of the second clamping handle, and the first limiting blocks and the second limiting blocks form stopping fit to limit a maximum opening angle between the clamping portions of the two clamping handles.

Furthermore, the connecting portion and clamping portion of each clamping handle are detachably connected.

Furthermore, the connecting portion of each clamping handle is provided with a protruding portion extending along a direction far away from the corresponding handle portion, and the clamping portion is detachably sleeved outside the protruding portion.

Furthermore, a locking ring is hinged to the handle portion of one clamping handle in the two clamping handles, the handle portion of the other clamping handle is provided with a clamping groove, and when the barbecue clamp is in an unused state, the locking ring is sleeved the handle portion of the other clamping handle, and is embedded into the clamping groove, and the clamping portions of the two clamping handles are pressed against each other.

According to the technical solution of the disclosure, the barbecue clamp comprises the two clamping handles which are intersected, the two clamping handles can rotate around the intersection of them, and the clamping portion and handle portion of each clamping handle are positioned on the two opposite sides of the intersection; the whole barbecue clamp is structurally like scissors, so that force can be conveniently applied to the handle portions to clamp the object; the handle portions are farer away from the clamping portions, that is, the handle portions are farer away from a fire source, so that a using safety coefficient of the barbecue clamp is increased; meanwhile, the barbecue clamp is provided with the illumination portion, so that convenience is brought to one-hand operation of an operator.

BRIEF DESCRIPTION OF THE DRAWINGS

The drawings forming a part of the disclosure are adopted to provide further understanding of the disclosure, and schematic embodiments of the disclosure and descriptions thereof are adopted to explain the disclosure, and do not form improper limits to the disclosure. In the drawings.

DETAILED DESCRIPTION OF THE EMBODIMENTS

Figure 1:
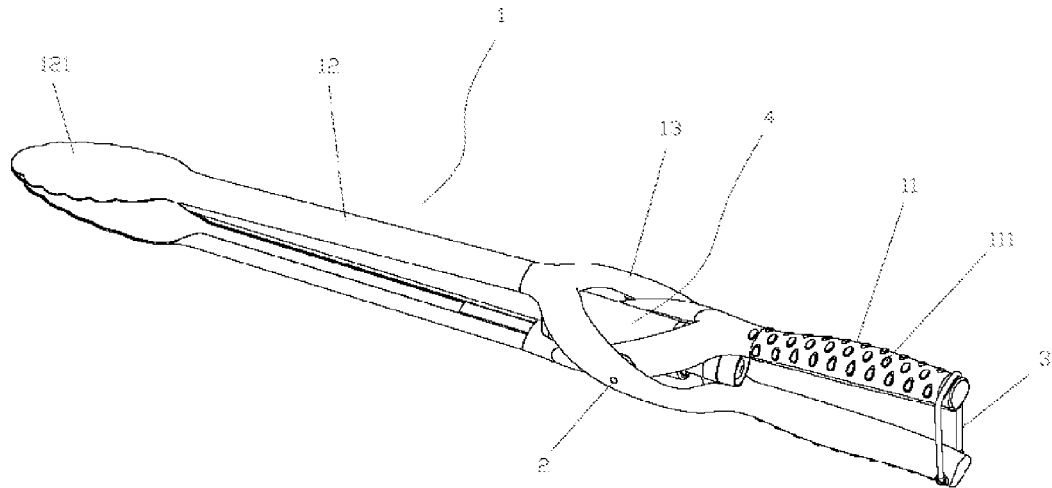
FIG. 1 is a diagram of a barbecue clamp in an unused state according to an embodiment of the disclosure.

The disclosure is described below with reference to the drawings and embodiments in detail. It is important to note that the embodiments in the disclosure and characteristics in the embodiments may be combined under the condition of no conflicts.

As shown in FIG. 1 to FIG. 6, according to the embodiment of the disclosure, a barbecue clamp is provided, which comprises two clamping handles 1, wherein the two clamping handles 1 are intersected into an X-shaped structure, each clamping handle 1 is provided with a handle portion 11 and a clamping portion 12, the handle portion 11 and clamping portion 12 of each clamping handle 1 are positioned on two opposite sides of an intersection of the two clamping handles respectively, and end parts, far away from the intersection, of the clamping portions 12 are clamping ends 121. An accommodation space is formed at the intersection of the two clamping handles 1, and is through along length directions of the clamping handles 1, a pivoting shaft 2 is arranged on each of two opposite sides of the accommodation space, the two pivoting shafts 2 are arranged as rotating shafts of the clamping handles 1 at an interval along the same pivoting axis, and during operation, force is applied to the handle portions 11 to rotate the clamping handles 1 around the pivoting shafts 2 to further make the clamping ends 121 of the two clamping handles 1 get far away from or close to each other. An illumination portion 4 is arranged in the accommodation space, and an illuminating direction of the illumination portion 4 faces a part between the clamping ends 121 of the two clamping handles 1. By such a barbecue clamp with the X-shaped structure, force can be conveniently applied to the handle portions 11 to clamp an object; the handle portions 11 are farer away from the clamping portions 12, so that a fire source can be effectively avoided, and a safety coefficient of the barbecue clamp is increased; meanwhile, the barbecue clamp is provided with the illumination portion 4, then an operator can operate the barbecue clamp with one hand, and has the other hand at liberty for other work, so that efficiency is improved.

Preferably, the intersection is at positions, close to the handle portions 11, of the clamping handles 1, and a distance between the clamping ends 121 of the two clamping handles 1 can be regulated to a greater extent only by making the handle portions 11 of the two clamping handles 1 get far away from or close to each other by a small distance, so that convenience in the use of the barbecue clamp is improved.

Preferably, the handle portion 11 of each clamping handle 1 is provided with an antiskid structure 111, so that the handle portions 11 are conveniently handheld. The antiskid structures 111 may be antiskid bulges, and may also be antiskid strips.

Figure 2:
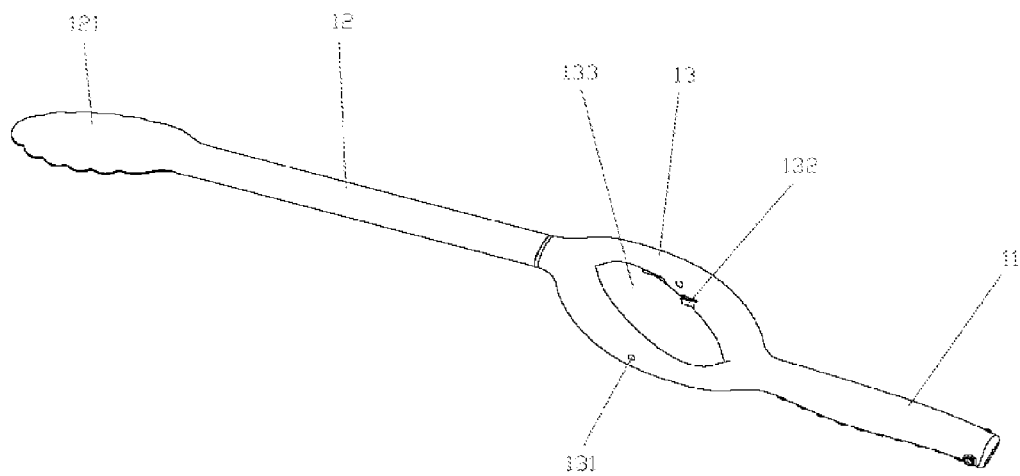
FIG. 2 is a diagram of one clamping handle according to an embodiment of the disclosure.
Figure 3:
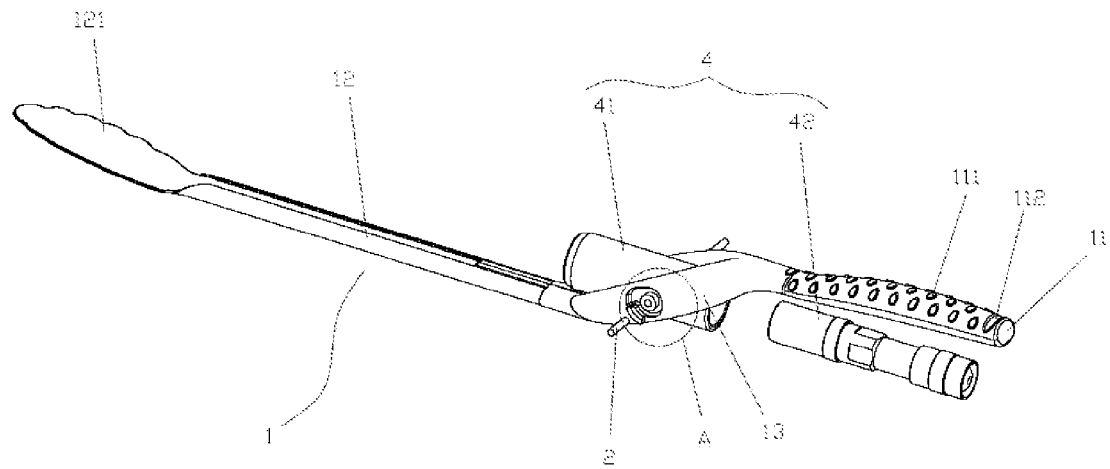
FIG. 3 is an assembling diagram of the other clamping handle and an illumination portion according to an embodiment of the disclosure.

As shown in FIG. 2 and FIG. 3, specifically, each clamping handle 1 further comprises a connecting portion 13. The connecting portion 13 of each clamping handle 1 is connected between the corresponding handle portion 11 and clamping portion 12, the connecting portions 13 of the two clamping handles 1 are intersected to form the accommodation space, and the pivoting shafts 2 are arranged at the intersection.

In order to facilitate clamping, preferably, the connecting portion 13 of each clamping handle 1 is inclined relative to the corresponding handle portion 11 and clamping portion 12, and in such a manner, when the clamping ends 121 of the clamping portions 12 of the two clamping handles contact with each other, the handle portions 11 of the two clamping portions 1 may keep a certain distance so as not to be attached to each other, the movement of the handle portions 11 can be conveniently controlled by the hand, and the illumination portion 4 is also avoided. The pivoting shafts 2 are arranged on the connecting portions 13 in a penetration manner to realize the rotation of the clamping handles 1 around the pivoting shafts 2.

Preferably, the connecting portion 13 of each clamping handle is of a ring structure, each ring structure is provided with a hollow inner ring 133, and the inner ring of the connecting portion 13 of one clamping handle 1 in the two clamping handles 1 is inserted in the inner ring 133 of the connecting portion 13 of the other clamping handle 1, which requires an outer periphery of the connecting portion 13 of one clamping handle 1 to be smaller and adapted to an inner periphery of the connecting portion 13 of the other clamping handle 1 for conveniently assembling the connecting portions 13 of the two clamping handles 1. The connecting portions 13 of the two clamping handles 1 are intersected, that is, the two ring structures are intersected, and the accommodation space is formed between the inner rings 133 of the two ring structures.

There are two pivoting shafts 2, and the two pivoting shafts 2 are arranged at an interval, so that areas of the inner rings 133 of the two connecting portions 13 are reserved, interference with the accommodation space is avoided to facilitate the mounting of the illumination portion 4, and compared with a longer pivoting shaft, two shorter pivoting shafts 2 are easier to mount and more difficult to deform.

After the two pivoting shafts 2 are extracted, the two clamping handles 1 can be separated from each other and used as an independent product respectively.

Figure 4:
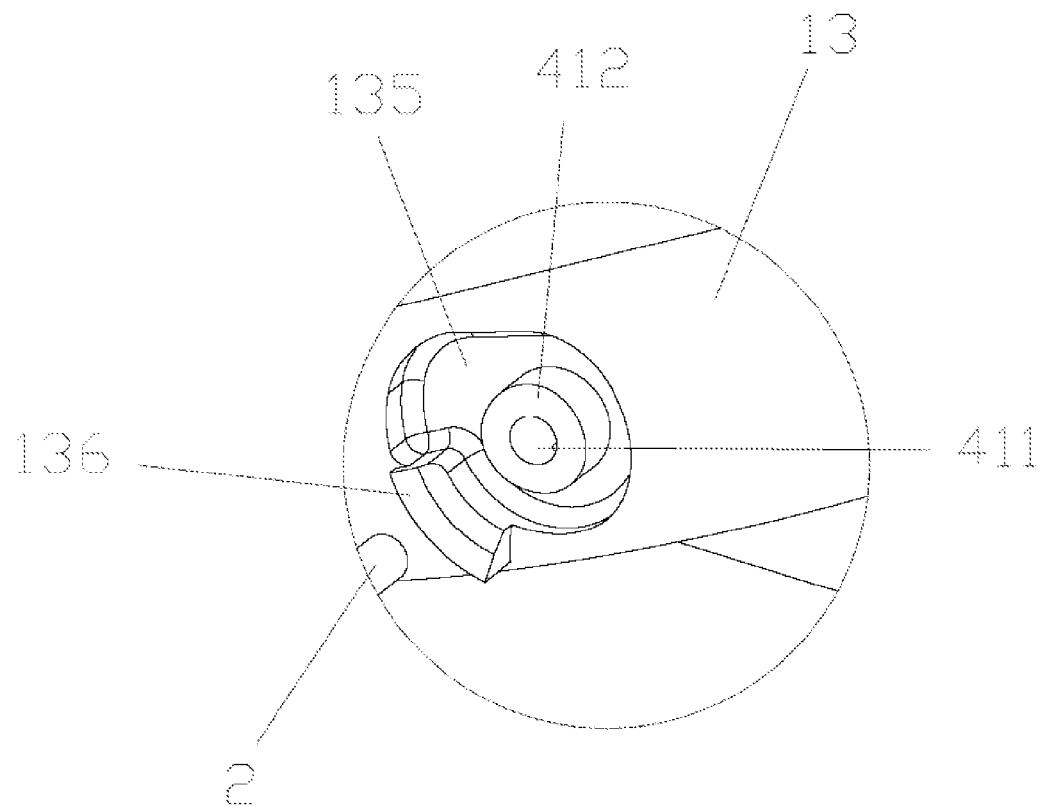
FIG. 4 is an enlarged view of part A in FIG. 3.
Figure 5:
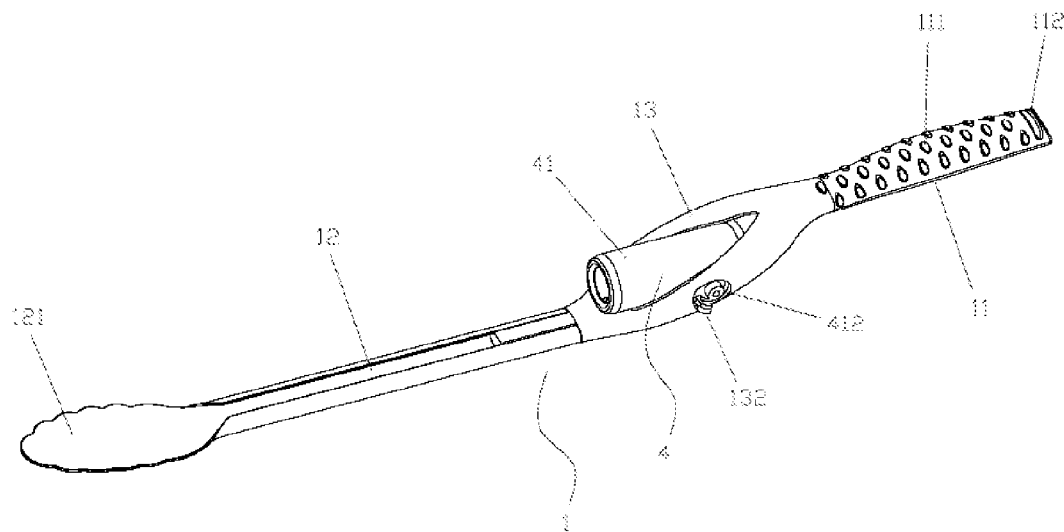
FIG. 5 is a diagram of mounting an illumination portion on the other clamping handle according to an embodiment of the disclosure.

As shown in FIG. 3 to FIG. 5, preferably, the illumination portion 4 comprises a sleeve 41 and a light source 42, wherein the sleeve 41 is inserted between the inner rings 133 of the connecting portions 13 of the two clamping handles 1, lug bosses 412 extending along a radial direction of the sleeve 41 are arranged on two opposite sides of the sleeve 41, each lug boss 412 is provided with a first shaft hole 411, the first shaft holes 411 are formed along extending directions of the lug bosses 412, mounting holes 135 are formed in two opposite sides of the connecting portion 13 on the inner side in the connecting portions 13 of the two clamping handles 1 respectively, the mounting holes 135 correspond to the lug bosses 412 on the same sides, second shaft holes 131 are formed in two opposite sides of the connecting portion 13 on the outer side, the second shaft holes 131 correspond to the first shaft holes 411 in the same sides, and extend in the same directions as the first shaft holes 411, and after assembling, the lug bosses 412 of the sleeve 41 are inserted in the mounting holes 135 in the corresponding sides, and the pivoting shafts 2 are arranged in the first shaft holes 411 and second shaft holes 131 in the corresponding sides in a penetration manner. The light source 42 is detachably arranged in the sleeve 41, the light source 42 is preferably a flashlight, and the flashlight is inserted in the sleeve 41; and a diameter of the flashlight is slightly greater than or equal to an internal diameter of the sleeve 41, so that the flashlight can be connected to the interior of the sleeve 41 in a pressing manner, and is prevented from being separated by virtue of squeezing positioning of the sleeve 41. Of course, the flashlight may further be arranged in the sleeve 41 in a clamping manner, or openable and closable end covers are arranged at end parts of the sleeve 41 so as to mount or dismount the flashlight.

In order to limit an opening angle between the clamping portions 12 of the two clamping handles 1, a limiting structure is preferably arranged between the two clamping handles 1, and specifically, first limiting blocks 136 are arranged on the connecting portion 13 on the inner side in the connecting portions 13 of the two clamping handles 1, and there are two first limiting blocks 136 which are arranged on the two opposite sides of the connecting portion 13 respectively and positioned on an outer wall surface of the connecting portion 13. Second limiting blocks 132 are arranged on the connecting portion 13 on the outer side, there are two second limiting blocks 132 which are arranged on the two opposite sides of the connecting portion 13 respectively and positioned on an inner wall surface of the connecting portion 13, and when the two clamping handles 1 rotate around the pivoting shafts 2 and the clamping ends 121 of the clamping portions 12 of the two clamping handles 1 get far away from each other, the first limiting blocks 136 form stopping fit with the second limiting blocks 132 on the same sides to disable the two clamping handles 1 to continuously rotate, thereby limiting a maximum opening angle between the clamping portions 12 of the two clamping handles 1.

Here, the opening angle refers to an included angle between longitudinal centrelines of the two clamping handles 1.

Preferably, the first limiting blocks 136 are formed at the mounting holes 135 of the connecting portion 13 on the inner side, so that compact structure and convenience in assembling are ensured.

Figure 6:
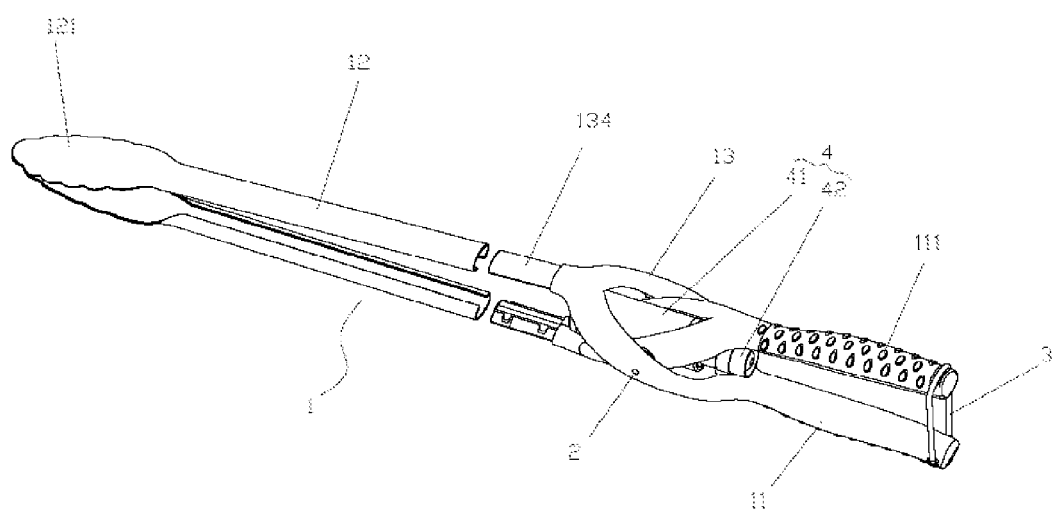
FIG. 6 is a disassembling diagram of clamping portions and connecting portions according to an embodiment of the disclosure.

As shown in FIG. 1 and FIG. 6, preferably, a locking ring 3 is arranged on the handle portion 11 of one clamping handle 1 in the two clamping handles 1, the locking ring 3 is hinged to the end part, far away from the corresponding clamping portion 12, of the handle portion 11, the handle portion 11 of the other clamping handle 1 is provided with a clamping groove 112 corresponding to the locking ring 3, and when the barbecue clamp is not used, the clamping ends 121 of the clamping portions 12 of the two clamping handles 1 are pressed against each other, and the locking ring 3 rotates to sleeve the handle portion 11 of the other clamping handle 1 and be embedded into the clamping groove 112, so that the barbecue clamp can be prevented from being casually opened, and safety is improved.

Furthermore, the locking ring 3 is preferably of a frame-shaped structure formed by bending a strip-type structure, one side of the frame-shaped structure is unclosed to form two opposite support legs, the other three sides are closed and continuously extend, and the two support legs are arranged on the two opposite sides of the handle portion 11 as pivoting shafts in the penetration manner, so that the barbecue clamp is simple in structure and easy to operate.

As shown in FIG. 6, the connecting portion 13 and clamping portion 12 of each clamping handle 1 preferably form a detachable structure, specifically, the connecting portions 13 are provided with protruding portions 134 extending far away from the intersection, and the clamping portions 12 can be sleeved outside the protruding portions 134 to realize connection with the connecting portions 13. The clamping portions 12 are connected with the protruding portions 134 in manners of clamping, welding, interference fit and the like. When the clamping portions 12 are detached from the connecting portions 13, clamping portions in other shapes can be arranged on the connecting portions 13 instead to meet clamping requirements of different objects.

By the detachable structures formed by the connecting portions 13 and the clamping portions 12 as well as the independent design of the two clamping handles 1, the barbecue clamp can realize multiple functions during a practical application. For example, the connecting portions 13 are connected with the clamping portions 12, and then the two clamping handles 1 are connected through the pivoting shafts 2 to form a complete barbecue clamp; and after the pivoting shafts 2 are disassembled to separate the two clamping handles 1, the clamping portion 12 of the each clamping handle 1 is detached from the corresponding connecting portion 13, a fork head is assembled on the connecting portion 13 of one clamping handle 1, a shovel head is assembled on the connecting portion 13 of the other clamping handle 1, and then one clamping handle 1 forms a fork and the other clamping handle forms a shovel to realize different functions respectively. When the barbecue clamp is required to be used, the fork head and the shovel head are disassembled, the clamping portions 12 are assembled on the connecting portions 13, and then the two clamping handles 1 are connected together through the pivoting shafts 2.

From the above, it can be seen that the embodiment of the disclosure achieves technical effects as follows:

1. the two clamping handles of the barbecue clamp are intersected, and the clamping portions are farer away from the handle portions, that is, the hand of an operator can be farer away from the fire source, so that the hand is unlikely to be scalded; and 2. the barbecue clamp is provided with the illumination portion, so that the operator can conveniently operate the barbecue clamp with one hand, and may have the other hand at liberty for other work.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed:

1. A barbecue clamp, comprising two connected clamping handles (1), each of the two clamping handles (1) being provided with a clamping portion (12) and a handle portion (11), wherein the two clamping handles (1) are intersected, and the clamping portion (12) and handle portion (11) of each clamping handle (1) are positioned on two opposite sides of an intersection of the two clamping handles;

an accommodation space is formed at the intersection of the two clamping handles (1), a pivoting shaft (2) is arranged on each of two opposite sides of the accommodation space, the pivoting shafts (2) are arranged at an interval along the same pivoting axis, and the two clamping handles (1) are arranged in a manner of rotating around the pivoting shafts (2); and the barbecue clamp further comprises an illumination portion (4), the illumination portion (4) is arranged in the accommodation space, and an illuminating direction of the illumination portion (4) faces a clamping area between the clamping portions (12) of the two clamping handles (1).

2. The barbecue clamp according to claim 1, wherein each of the two clamping handles (1) comprises a connecting portion (13), the connecting portion (13) is connected between the clamping portion (12) and the handle portion (11), the connecting portions (13) of the two clamping handles (1) are intersected, the accommodation space is formed at the intersection, and the pivoting shafts (2) are arranged at the intersection in a penetration manner.

3. The barbecue clamp according to claim 2, wherein the connecting portion (13) of each clamping handle (1) is inclined relative to the corresponding clamping portion (12) and handle portion (11).

4. The barbecue clamp according to claim 2, wherein the connecting portion (13) of each clamping handle (1) is of a ring structure, an inner ring of the connecting portion (13) of the first clamping handle (1) in the two clamping handles (1) is detachably inserted in an inner ring (133) of the connecting portion (13) of the second clamping handle (1), and the accommodation space is formed between the inner rings (133) of the connecting portions (13) of the two clamping handles (1).

5. The barbecue clamp according to claim 4, wherein the illumination portion (4) comprises:
 a sleeve (41), inserted in the accommodation space; and
 a light source (42), detachably connected to the interior of the sleeve (41) in a pressing manner.

6. The barbecue clamp according to claim 5, wherein the sleeve (41) is provided with lug bosses (412) extending along a radial direction of the sleeve (41), the lug bosses (412) are provided with first shaft holes (411), the connecting portion (13) of the first clamping handle (1) is provided with mounting holes (135), the connecting portion (13) of the second clamping handle (1) is provided with second shaft holes (131), the lug bosses (412) are detachably inserted in the mounting holes (135), and the pivoting shafts (2) are detachably arranged in the first shaft holes (411) and the second shaft holes (131) in a penetration manner.

7. The barbecue clamp according to claim 4, wherein a plurality of first limiting blocks (136) are arranged on an outer wall surface of the connecting portion (13) of the first clamping handle (1), a plurality of second limiting blocks (132) are arranged on an inner wall surface of the connecting portion (13) of the second clamping handle (1), and the first limiting blocks (136) and the second limiting blocks (132) form stopping fit to limit a maximum opening angle between the clamping portions (12) of the two clamping handles (1).

8. The barbecue clamp according to claim 2, wherein the connecting portion (13) and clamping portion (12) of each clamping handle (1) are detachably connected.

9. The barbecue clamp according to claim 8, wherein the connecting portion (13) of each clamping handle (1) is provided with a protruding portion (134) extending along a direction far away from the corresponding handle portion (11), and the clamping portion (12) is detachably sleeved outside the protruding portion (134).

10. The barbecue clamp according to claim 1, wherein a locking ring (3) is hinged to the handle portion (11) of one clamping handle (1) in the two clamping handles (1), the handle portion (11) of the other clamping handle (1) is provided with a clamping groove (112), and when the barbecue clamp is in an unused state, the locking ring (3) is sleeved the handle portion (11) of the other clamping handle (1) and is embedded into the clamping groove (112), and the clamping portions (12) of the two clamping handles (1) are pressed against each other.

* * * * *